United States Patent [19]

Burkhardt

[11] Patent Number: 4,776,452
[45] Date of Patent: Oct. 11, 1988

[54] MECHANISM FOR THE TRANSPORTATION OF OBJECTS

[76] Inventor: Volker Burkhardt, Lerchenstrasse 29, D-7085 Bopfingen, Fed. Rep. of Germany

[21] Appl. No.: 48,383

[22] Filed: May 11, 1987

[30] Foreign Application Priority Data

May 14, 1986 [DE] Fed. Rep. of Germany ....... 3616252

[51] Int. Cl.$^4$ ............................................. B65G 29/00
[52] U.S. Cl. .............................. 198/803.01; 198/465.1; 104/109
[58] Field of Search ............. 198/803.01, 465.1, 465.2, 198/343, 803.2, 779; 104/109, 107, 106, 118, 119, 170, 171, 172.3, 172.1; 29/33 P, 563

[56] References Cited

U.S. PATENT DOCUMENTS

| | | | |
|---|---|---|---|
| 3,949,859 | 4/1976 | Nussbaumer et al. | 198/803.2 X |
| 4,088,220 | 5/1978 | Jackson et al. | 198/343 X |
| 4,501,353 | 2/1985 | Burkhardt | 198/779 |
| 4,712,670 | 12/1987 | Burkhardt | 198/803.01 |

FOREIGN PATENT DOCUMENTS

| | | | |
|---|---|---|---|
| 2712214 | 9/1978 | Fed. Rep. of Germany | 198/465.3 |
| 2735987 | 3/1979 | Fed. Rep. of Germany | 198/779 |
| 3445249 | 6/1986 | Fed. Rep. of Germany | 198/803.2 |
| 0031426 | 2/1985 | Japan | 198/465.1 |

*Primary Examiner*—Robert J. Spar
*Assistant Examiner*—Cheryl L. Gastineau
*Attorney, Agent, or Firm*—Hayes, Davis & Soloway

[57] ABSTRACT

A mechanism for the transportation of objects on an endlessly rotating roller chain (4) of a support structure, which chain moves in or upon a support structure (1), having pallet-like sliding carriages (12) guided in or upon tracks of the support structure for receiving the objects to be transported. The sliding carriages are each provided with a guiding element (29) in which a second endless roller chain (34) or a sprocket wheel rotates with part of its rollers (35) or with the sprocket wheel engaging between the conveyor rollers (5) of the first roller chain (4), thereby resulting in a form locking. The guiding element (29) is provided with a member (41) that adjusts the carrying force of the second roller chain or of the sprocket wheel.

12 Claims, 3 Drawing Sheets

MECHANISM FOR THE TRANSPORTATION OF OBJECTS

The invention concerns a mechanism for transportation of objects upon an endlessly rotating roller chain that runs in or upon a support structure.

A baffle conveyor chain, for instance, can be used as the roller chain. Such a roller chain consists of a multiplicity of large diameter conveyor rollers and lateral tread rollers situated next to them on the same axis and guided on the tracks. Between each pair of consecutive conveyor rollers, lateral tread rollers likewise are additionally provided on a common axis. A multiplicity of separate links are thus consecutively arranged in series results in an endless roller chain (see, for instance, German Utility Model No. 82 27 706). A support structure, that serves as support for the roller chain is provided with corresponding tracks and has been described, for instance, in German Patent No. 31 48 177. In the case of large objects to be transported, two support structures arranged side-by-side and spaced apart from each other, are generally provided in which the roller chains respectively run and the goods to be transported resting on both roller chains.

Larger object or objects having contact surfaces can be placed directly on the baffle roller chain without any problem. Smaller objects or objects having no good contact surface with which they can be safely placed on the roller chain are transported on pallets having adequately constructed upper sides upon which the objects are placed. In this case, this means that the pallets are placed on the roller chain.

However, this is a disadvantage in that the pallets must be removed from the mechanism, at the point of destination, and be separately transported back to the starting point where they are again mounted on the roller chain. This procedure is relatively expensive and can result in interruptions in the transportation system. In addition, separate means may be needed for returning the emptied pallets.

In an older application it has already been proposed to build the pallets so as to be connected with the roller chain in the form of sliding carriages, either by frictional locking or by form-locking, so that the latter rotate endlessly with the roller chain. For this purpose carrier bars are disposed on the undersides of the sliding carriages against the rollers of the roller chain. Said carrier bars have on their undersides recesses which engage the conveyor rollers in the reverse or the curved section. The magnitude of the carrier force is regulated here by the magnitude of the contact pressure.

However, it has been found that the amount of contact pressure produced, that is, the carrier force for the sliding carriages, is not always sufficient in the case of heavy parts. This especially applies in the curved sections where the contact pressure in the recesses can be too weak. This means that deceleration occurs, that is, the roller chain passes through beneath the sliding carriages not only in the case of a blockage of the feeding of the sliding carriages, but also in normal operation, in the case of parts difficult to transport, the drag was not ensured by the friction.

Therefore, this invention is directed to the problem of ensuring a safe transport, even for heavy parts, while retaining the baffle roller conveyor principle.

According to the invention this problem is solved by disposing pallet-like sliding carriages upon the roller chain for receiving the objects to be transported. Each carriage is provided with a guide element in which a second roller chain or a sprocket wheel endlessly rotates and which, with a part of its rollers or with the sprocket wheel, engages between conveyor rollers of the roller chain to form a positive lock, said guide element being provided with a member that adjusts the carrying force of the second roller chain or sprocket wheel.

By disposing a second roller chain or sprocket wheel on or in each sliding carriage that interacts with the roller chain, a safe transportation in normal operation is ensured in any case. The rollers of the second roller chain are in the intermediate space between the conveyor rollers of the roller chain and form, in this manner, a kind of gearing whereby the sliding carriages are safely carried along by the rotating roller chain. The magnitude of the carrying force here depends on the contact pressure of the member that adjusts the carrying force. If the adjusted carrying force is exceeded, a relative movement between the roller chain and the corresponding roller chain or sprocket wheel takes place. This means that in this case when a deceleration occurs, the first roller chain passes through, as usual, beneath the sliding carriages. On the other hand, no relative movement takes place in normal operation between the two roller chains. The adjusting member that regulates the carrying force operates practically like a brake and prevents relative movements between the two roller chains or between the first roller chain and the sprocket wheel in the sliding carriages. The second roller chain only begins to rotate inside the sliding carriage after exceeding the carrying force, which is preferably adjustable, whereby the sliding carriage can be stopped while the first roller chain rotates further.

In an embodiment of the invention, the guide element has a shoe suspended in the lower area of the sliding carriage and with a track for the second roller chain.

Here the shoe is rotatably suspended on the sliding carriages.

In this manner the shoe, and thus also the sliding carriage, can adjust themselves in the curved and the reverse sections and also safely transport the sliding carriages in these sections by the first roller chain, since the gear-like engagement between the conveyor rollers has also been retained.

In a structural embodiment it can also be provided in this connection that the shoe has a box-like inner part with tracks; the inner part being pivotally connected with the sliding carriages via bearing pins on both sides.

It can further be provided, according to the invention, that the bearing pins are each fastened to a bearing support which is yieldably disposed in a receiving part of the sliding carriage so as to make relative movement of the shoe perpendicular to the sliding carriage possible.

In this manner changes in adjustment of the contact pressure and compensating movements in curved sections are possible in a simple manner.

The adjusting member that regulates the carrying force can be a bar pressed against the conveyor rollers by springs.

For this purpose it generally suffices that the bars have a length such as to extend over a few conveyor rollers.

The bars are advantageously constructed in a manner such that the amount of the carrying force can be adjustable.

It will in general be sufficient if the bar is only pressed upon the conveyor rollers. But for very heavy objects it can be advantageous if it is additionally compressed on the lateral tread rollers. In this manner an additional sliding friction results and therewith a higher transmissible carrying force.

Advantageous embodiments and constructions result from the sub-claims and from the embodiment described in principle herebelow with reference to the drawings.

Figure 2:
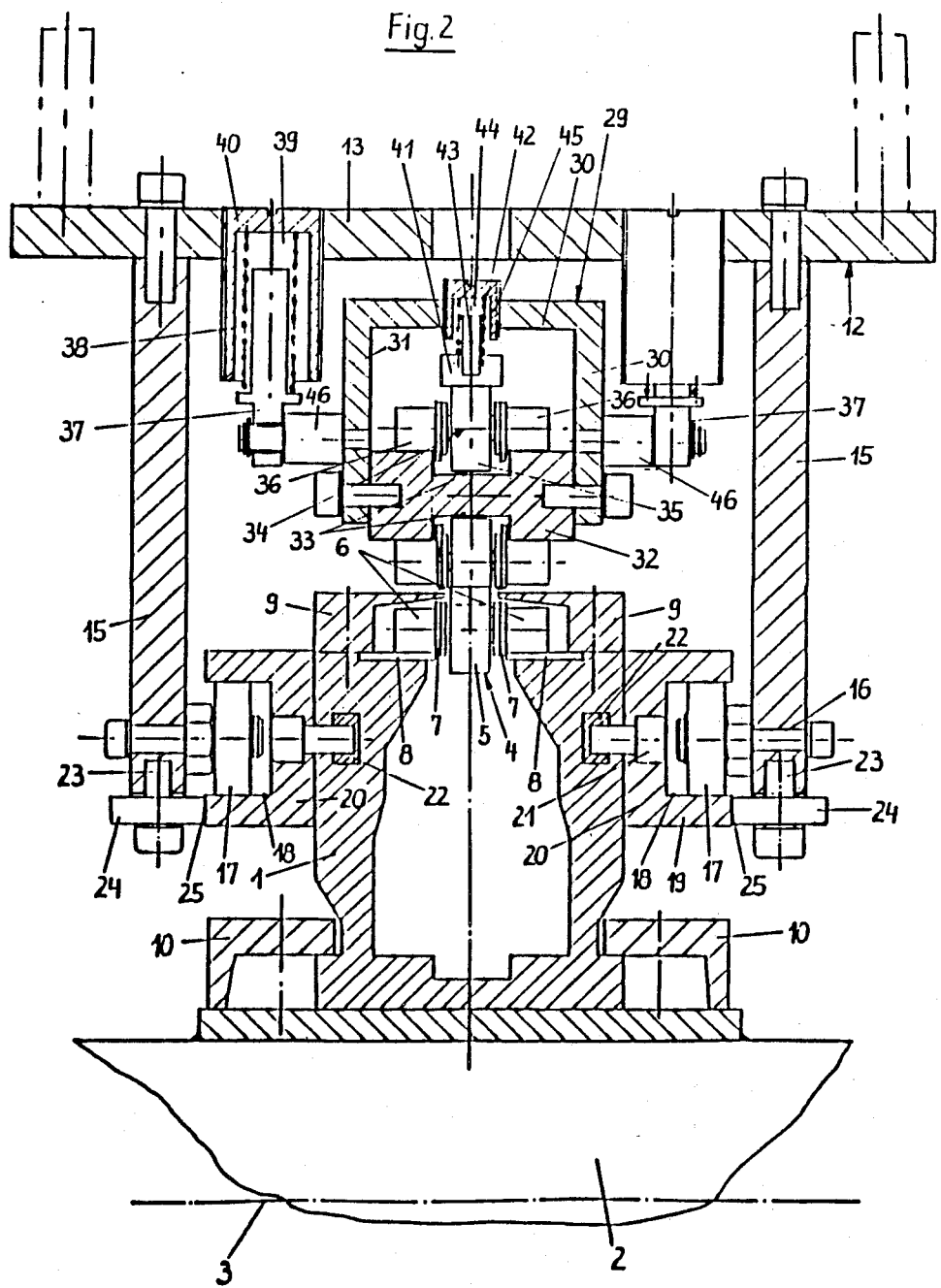
FIG. 2 is an enlarged section along line II—II of FIG. 1.

The mechanism according to the invention has a support structure 1, the construction of which can be more clearly seen in FIG. 2. Beneath a support 2 through which extends a reverse axis 3, another support structure for the return motion of a first roller chain 4 can be fastened. The first roller chain 4 is a baffle conveyor chain such as described, for instance, in German Utility Model No. 82 27 706. It has a central conveyor roller 5 and tread rollers 6 laterally situated one on either side of it and on the same axis. Each chain link is followed by a further link having two tread rollers connected with the preceding tread rollers 6 by a fish-plate 7. Each chain link follows the previous link upon the axis of which two tread rollers 6 and a conveyor roller 5 are situated. The tread rollers 6 each run upon a spring-steel rail or track 8. Covers 9 partially cover at least the first roller chain 4 for safety reasons. The support structure 1 can be fastened on the support 2 by clamps 10.

In the reverse sections which lead downwards in the embodiment illustrated, the support structure is turned 180° to join a return motion section 11, not shown in detail. The drive for the roller chain 5 can also be situated in the return motion section.

The mechanism according to the invention can also be tilted 90°. This means that the return in this case does not take place in a vertical plane, but the first roller chain 4 is horizontally deviated 90°. In such a case, FIG. 1 would constitute a top view for which only the sliding carriages 12 would be constructed differently for adequately receiving the workpieces to be transported.

Figure 1:
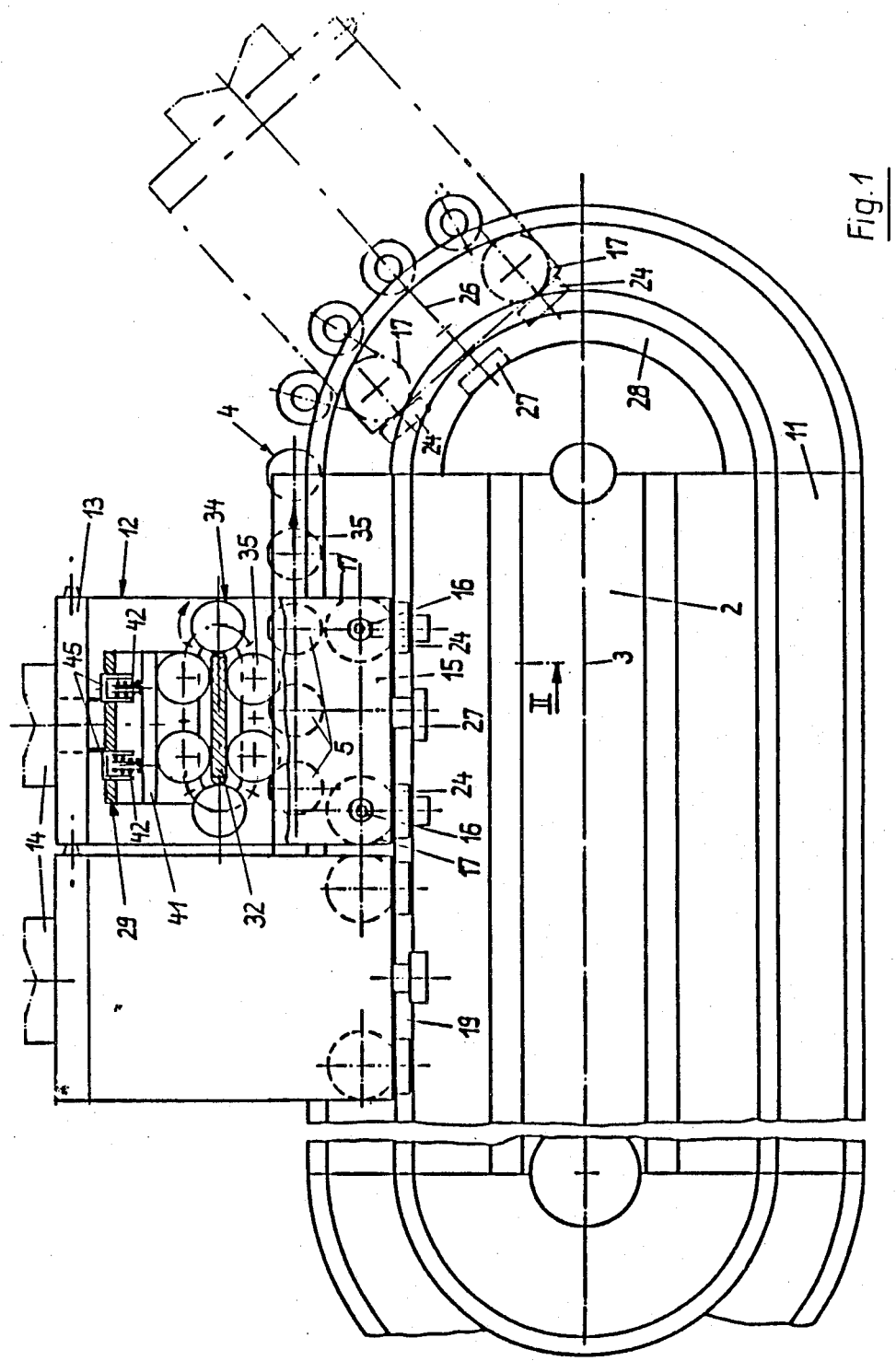
FIG. 1 is a side view of the transportation mechanism according to the invention.

The sliding carriages 12 can be understood in principle from FIG. 1. More details result from FIG. 2 which shows a section II—II of FIG. 1.

Each sliding carriage 12 has a base plate 13 and a workpiece-receiving part 14, constructed according to the shape and construction of the object to be transported. A cover 15 projects downwardly from the base plate 13 on each side of the support structure 1. A bore is provided in the front and rear areas respectively of the cover 15 through which a shaft 16 of a tread roller 17 is inserted. The tread rollers 17 run on tracks 18 formed on the inner side of a leg 19 of a U-section 20. The U-section 20 is secured to the support structure 1 by screws 21 and grooved blocks 22. During the return motion section 11 in FIG. 2 the upper leg of the U-section forms the tracks for the tread rollers 17.

A vertical bore is situated, at the lower end of the cover 15, in the front and rear areas respectively in which the shaft 23 of a guide roller 24 is supported.

Both guide rollers or simple plastic slide bars 24 each move on a track 25 formed on the outer end of the leg 19 of the U-section 20. As can be especially seen in FIG. 2, a lateral guidance for the sliding carriage 12 is obtained in this manner.

Additionally, central guide roller 27 is in the area of the longitudinal pivot axis 26 but, as can be understood from FIG. 1, it is at a greater distance from the base plate 13 of the sliding carriage 12, or is further down than the two guide rollers 17. The central guide roller 27 is thus beneath the track 25.

It can be seen, from FIG. 1, how the central guide roller 27 operates, since it is used in both curved sections. A sliding carriage 12 is shown in dotted lines in the right half of FIG. 1. As can be seen, both outer guide rollers 24 stand diagonally with respect to the direction of travel and thus "grindingly" act upon the tracks 25. For this reason the length of the leg 19 of the U-section 20 is shortened in the curved sections so that the guide rollers 24 do not contact with the track 25. Instead a curved track 28 upon which the central guide roller 27 moves is provided in the radial inner area. Since this guide roller is in the area of the longitudinal pivot axis 26 of the sliding carriage 12, it moves exactly upon the curved track 28. In the return motion section 11, the two outer guide rollers 24 are then again used, and the correspondingly lengthened leg 19 of the U-section are then again in use, while the central guide roller 27 is free.

The tread roller 17 support the weight and stress of the sliding carriage and of the objects to be transported. A guiding element 29, disposed beneath the base plate 13 and between the two covers 15, carries the sliding carriage 12. The guiding element 29 has an inner part 30 which has a U-section with two legs 31 which project in the direction toward the support structure 1. A plastic rail 32 is situated by means of screws between the free ends of both legs 31 and forms a track 33 on its upper side and lower side respectively. A second roller chain 34, constructed in the same manner as the first roller chain 4, rotates on the track 33. It likewise has conveyor rollers 35 and lateral tread rollers 36.

However, a triple roller chain that has centrally disposed cams instead could be also provided which then would engage between the conveyor rollers of the first conveyor chain. The same applies to other kinds of chain. It is only essential that an engagement exists each time with a chain link between each two conveyor rollers 5 of the first conveyor chain 4 in the track thereof.

As can be seen from FIG. 1, a conveyor roller 35 of the second roller chain is between each two conveyor rollers 5 of the first conveyor chain 4. In the illustrated case, two conveyor rollers 35 with three conveyor rollers 5 that surround them are respectively in use.

The guiding element 29 is constructed as shown with the inner part 30 pivotally mounted beneath the sliding carriage 12 by bearing pins 46 which project laterally from both legs 31. This means that both bearing pins 46 are in the central plane of the inner part 30. Both bearing pins 46 are fastened on bearing supports 37 which in turn are fastened to compression springs 38. The upper ends of the compression springs 38 are fastened to the inner bores 39 of a threaded bushing 40. The threaded bushing 40 is screwed on the base plate 13 and serves as receiving part for the sliding carriage 12. For this purpose the guide elements 29 are provided with corresponding threads so that the entire guiding element can be vertically adjusted in height to the first conveyor chain 4, and thus good contact is always maintained between the conveyor rollers 35 and the conveyor rollers 5.

A bar 41 determines the magnitude of the carrying force of the second roller chain 34 with the first roller chain 4. The bar is pressed by springs 42 upon the conveyor rollers 35 guided on the upper track 33. Two springs 42, as can be seen from FIG. 1, are disposed spaced apart from each other and guided by pins 43. The springs 42 support themselves respectively in an inner bore 44 of a screw thread 45, screwed in a respective threaded bore in the inner part 30. The contact pressure can also be regulated by adjustment of the corresponding screw thread 45.

The bar 41 acts practically like a brake shoe on the upper conveyor rollers 34 and prevents, in normal operation, relative movement between the first conveyor chain 4 and the second conveyor chain 34. In this manner the sliding carriages 12 are transported by the first conveyor chain 4.

Owing to the fact that a practically form-locking connection takes place via both roller chains, there occurs a safe drag that can also be maintained in the curved sections. For this purpose the guiding element can be accordingly rotated by the bearing pins 46.

However, deceleration takes place as soon as the carrying force is overcome by the pressed bar 41, and then relative movement can occur between both roller chains. This means that the second roller chain 34, in this case, also rotates and thus the sliding carriage stops.

Figure 3:
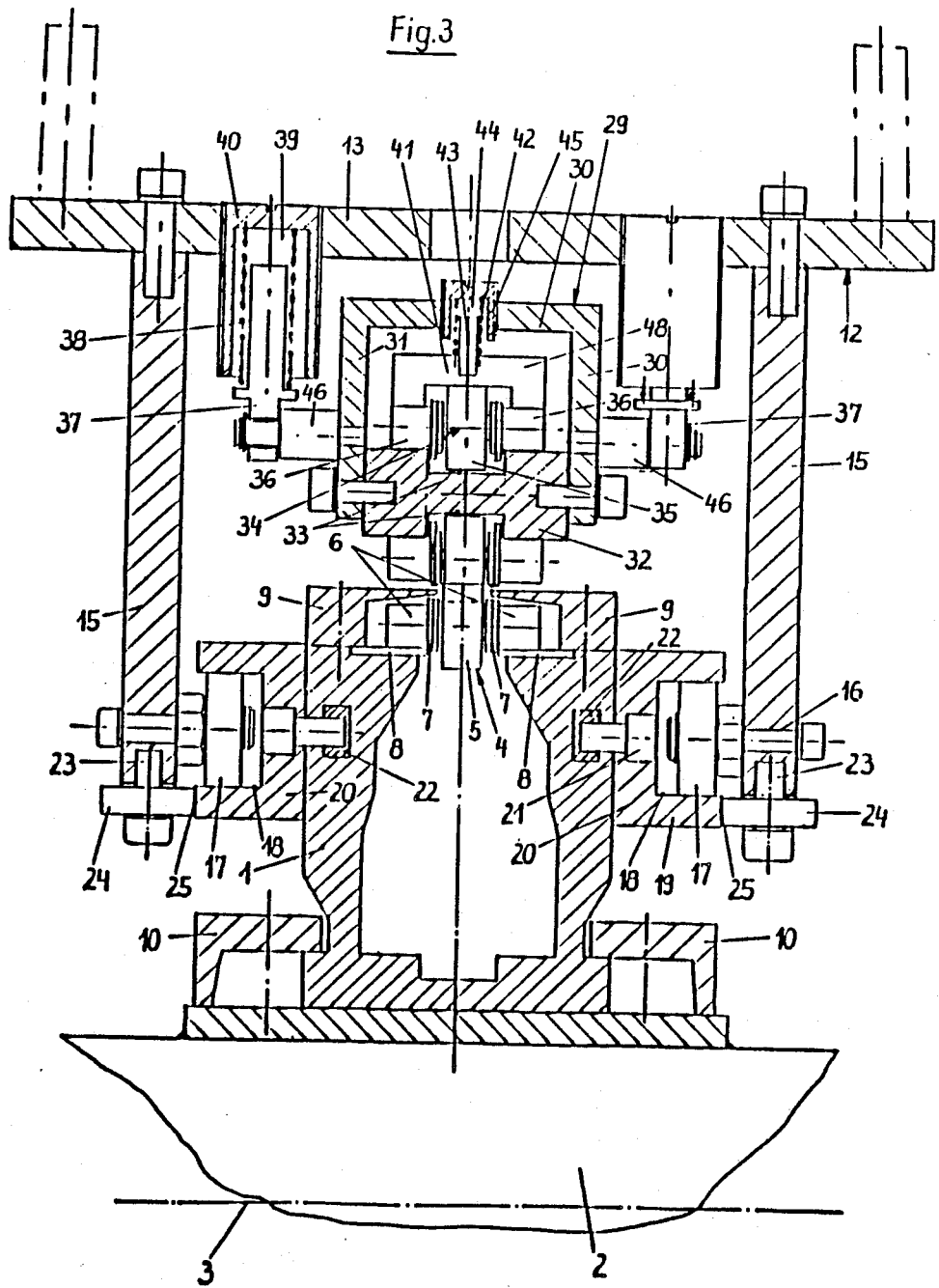
FIG. 3 is an enlarged section along line II—II of FIG. 1 which shows an alternative embodiment to that shown in FIG. 2.

As can be seen in FIG. 3, the bar 41 can be laterally broadened so as to press with a corresponding attachment 48 upon the tread rollers 36.

Instead of a rotating roller chain 34, which—as shown—engages with two intermediate spaces of the roller chain 4, the same principle can be obtained with a sprocket wheel that is likewise pressed into the space between two successive conveyor rollers 5. The sprocket wheel is likewise supported from the inner part, for instance, and a slip coupling is provided in this case instead of a bar 41, which in normal operation holds the sprocket wheel 4 fast and allows rotation of the sprocket wheel only when a certain torque is exceeded and therewith relative movement of the roller chain.

I claim:

1. A mechanism for transporting objects on an endlessly rotating roller chain that moves in or upon a support structure, characterized in that pallet-like sliding carriages (12) are disposed on said roller chain (4) which is guided by tracks on said support structure (1), each sliding carriage being provided with a guiding element (29) in which an endless roller chain (34) rotates on a track and a portion of its rollers (35) engages between consecutive conveyor rollers (5) of said first roller chain (4) and results in a form locking engagement, said guiding element (29) being provided with a carrying force adjustment member (41) supplying force against said second roller chain (34).

2. A mechanism according to claim 1, characterized in that said guiding element has suspended in the lower area of said sliding carriage (12) a shoe with a track for said second roller chain.

3. A mechanism according to claim 2, characterized in that said shoe (29) is rotatably suspended on said sliding carriage (12).

4. A mechanism according to claim 3, characterized in that said shoe (29) has an inner part (30) being pivotally connected on both sides by bearing pins (46) with said sliding carriage (12) and forming a track (33).

5. A mechanism according to claim 4, characterized in that each said bearing pins (46) being secured a bearing support (37), each said bearing support being resiliently disposed in a thread bushing (40) of said sliding carriage so as to make possible relative movement of said shoe (30) perpendicular to the transportation direction.

6. A mechanism according to claim 5, characterized in that said bearing support (37) is secured to a compression spring (38) which is secured in the interior of the threaded bushing (40) adjustably connected as receiving part with said sliding carriage.

7. A mechanism according to claim 4, characterized in that said inner part (30) has a rail (32) disposed between the two legs (31) of the U-section which forms the track (33) for said second roller chain (34).

8. A mechanism according to claim 1, characterized in that said carrying-force adjusting member is a bar (41) resiliently compressed against said second roller chain (34).

9. A mechanism according to claim 8, characterized in that said bar (41) is adjustably connected with said guiding element (29) by springs (42) and screw adjusting means (45).

10. A mechanism according to claim 9, characterized in that said screw adjusting means has screw threads and said springs (42) are situated in the interior of said adjusting means.

11. A mechanism according to claim 8 characterized in that said bar (41) is pressed upon both said conveyor rollers (35), of said second roller chain (34), and lateral tread rollers (36) thereof.

12. A mechanism according to claim 8, characterized in that said bar (41) is made of steel.

* * * * *